United States Patent
Xu et al.

(10) Patent No.: US 8,286,032 B2
(45) Date of Patent: Oct. 9, 2012

(54) TRACE MESSAGING DEVICE AND METHODS THEREOF

(75) Inventors: Zheng Xu, Austin, TX (US); Suraj Bhaskaran, Austin, TX (US); Richard G. Collins, Austin, TX (US); Jason T. Nearing, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 220 days.

(21) Appl. No.: 12/432,296

(22) Filed: Apr. 29, 2009

(65) Prior Publication Data

US 2010/0281308 A1    Nov. 4, 2010

(51) Int. Cl.
    *G06F 11/00* (2006.01)
(52) U.S. Cl. .......................................... 714/37
(58) Field of Classification Search .............. 714/11, 714/12, 18, 26, 27, 30, 31, 37–39, 45–47
    See application file for complete search history.

(56) References Cited

U.S. PATENT DOCUMENTS

| | | | |
|---|---|---|---|
| 6,145,122 A | 11/2000 | Miller et al. | |
| 6,615,370 B1* | 9/2003 | Edwards et al. | 714/45 |
| 6,665,816 B1 | 12/2003 | Edwards et al. | |
| 6,732,307 B1 | 5/2004 | Edwards | |
| 6,779,145 B1 | 8/2004 | Edwards et al. | |
| 6,918,065 B1* | 7/2005 | Edwards et al. | 714/45 |
| 6,941,482 B2 | 9/2005 | Strong | |
| 7,031,869 B2* | 4/2006 | Litt et al. | 702/125 |
| 7,346,476 B2 | 3/2008 | Levine et al. | |
| 2002/0188888 A1 | 12/2002 | Rivoir | |
| 2003/0145255 A1* | 7/2003 | Harty et al. | 714/48 |
| 2005/0138484 A1* | 6/2005 | Moyer et al. | 714/47 |
| 2005/0276385 A1* | 12/2005 | McCormick et al. | 379/1.02 |
| 2007/0089095 A1* | 4/2007 | Thekkath et al. | 717/128 |
| 2007/0168968 A1 | 7/2007 | Bates et al. | |
| 2007/0174707 A1* | 7/2007 | Sarkar et al. | 714/37 |
| 2008/0162272 A1* | 7/2008 | Huang et al. | 705/11 |
| 2008/0201615 A1 | 8/2008 | Bottemiller et al. | |
| 2009/0125756 A1* | 5/2009 | Swaine et al. | 714/45 |
| 2010/0268990 A1* | 10/2010 | Xu et al. | 714/27 |

OTHER PUBLICATIONS

U.S. Appl. No. 12/389,153, filed Feb. 19, 2009.
U.S. Appl. No. 12/389,156, filed Feb. 19, 2009.
U.S. Appl. No. 12/432,241, filed Apr. 29, 2009.
Office Action mailed Dec. 29, 2010 in U.S. Appl. No. 12/432,241.
"Standard for a Global Embedded Processor Debug Interface" The Nexus 5001 Forum(TM); Dec. 23, 2003; 166 pgs; IEEE Industry Standards and Technology Organization.
Office Action mailed Jun. 1, 2011 in U.S. Appl. No. 12/432,241.
Advisory Action mailed Aug. 12, 2011 in U.S. Appl. No. 12/432,241.

* cited by examiner

*Primary Examiner* — Nadeem Iqbal

(57) ABSTRACT

A method of generating timestamped trace messages includes generating a trace message in response to an event at an instruction pipeline of a data processing device. If timestamping is enabled, timestamps are only included in the trace message only if a programmable condition is detected. For example, a timestamp can be included in the trace message if the amount of space used to store messages at a trace message buffer exceeds a watermark value. The condition that results in a timestamped trace message is programmable, and can be selected via a debug interface. Because timestamps are only included in trace messages when the programmable condition is satisfied, some trace messages will not include a timestamp, thereby reducing the amount of buffer space needed to store the trace messages.

17 Claims, 4 Drawing Sheets

TRACE MESSAGING DEVICE AND METHODS THEREOF

FIELD OF THE DISCLOSURE

The present disclosure is related generally to data processing devices and is more particularly related to tracing operations at a data processing device.

BACKGROUND

It is sometimes desirable to analyze performance of a data processing device as the device executes a set of instructions. Accordingly, a device monitoring tool can be used to monitor a data processing device to determine how device resources are employed as instructions are executed. For example, the device monitoring tool may identify the most frequently executed modules and instructions in the device, or may identify how modules allocate memory or perform I/O requests.

One such device monitoring tool is a trace tool. The trace tool monitors the instruction pipeline and, in response to designated events, generates trace messages, such that each trace message includes information about the state of a portion of the pipeline. For example, the trace message can include information such as a process identifier, a thread identifier, a program counter, and the like. Further, the information in a trace may vary depending on a particular profiling or analysis that is to be performed. Each trace message can be stored in a buffer of the data processing device for access by an external debugger. However, as the complexity of data processing devices has increased, the amount of information in each trace message has increased. As the size of each trace message increases, the amount of trace buffer space required to store the messages can become undesirably large.

DETAILED DESCRIPTION

A method of generating timestamped trace messages includes generating a trace message in response to an event at an instruction pipeline of a data processing device. If timestamping is enabled, timestamps are only included in the trace message if a programmable condition is detected. For example, a timestamp can be included in the trace message if the amount of space used to store messages at a trace message buffer exceeds a watermark value. The condition that results in a timestamped trace message is programmable, and can be selected via a debug interface. Because timestamps are only included in trace messages when the programmable condition is satisfied, some trace messages will not include a timestamp, thereby reducing the amount of buffer space needed to store the trace messages.

Figure 1:
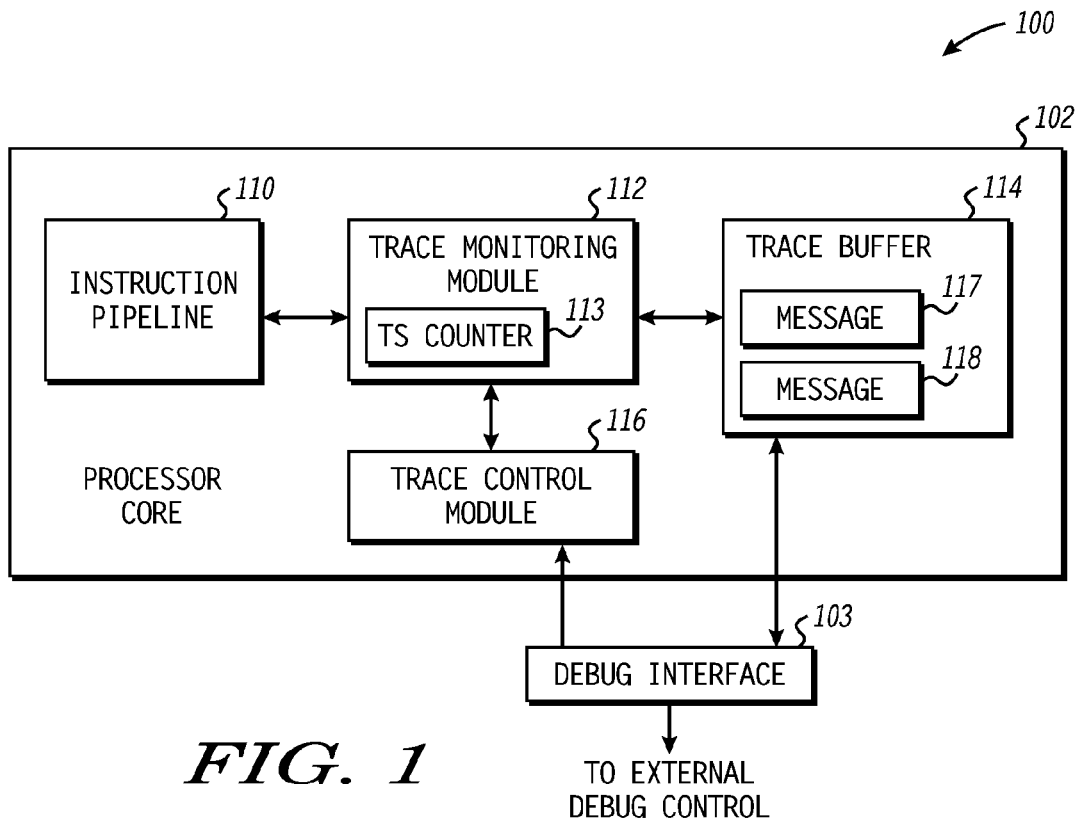
FIG. 1 illustrates a block diagram of a data processing device in accordance with one embodiment of the present disclosure.

Referring to FIG. 1, a block diagram of a data processing device 100 in accordance with one embodiment of the present disclosure is illustrated. The data processing device 100 includes a processor core 102 and a debug interface 103. The processor core 102 includes an instruction pipeline 110, a trace monitoring module 112, a trace buffer 114, and a trace control module 116. The instruction pipeline is connected to the trace monitoring module 112. The trace monitoring module 112 is connected to the trace control module 114 and the trace control module 116. The trace buffer 114 and trace control module 116 are each connected to the debug interface 103. The debug interface 103 is connected to an input/output port (not shown) of the data processing device 100. The input/output port is connected to an external debugger (not shown), such as a computer device.

The debug interface 103 is an interface device, such as a joint test action group (JTAG) interface, configured to receive debug control information from the external debugger and provide the debug control information to the processor core 102. In addition, the debug interface 103 can provide access to information stored at the processor core 102 for the external debugger. For example, the debug interface 103 can allow the external debugger to retrieve information stored at the trace buffer 114.

The instruction pipeline 110 includes one or more modules configured to execute instructions received at the processor core 102. For example, the instruction pipeline 110 can include a fetch module to retrieve instructions from an instruction cache, a decode module to decode each retrieved instruction, one or more execution modules to execute decoded instructions, and a retirement module to retire executed instructions. To process each instruction, the instruction pipeline 110 can store and modify state information, such as program counter information, control information for each execution module, and the like. The state information is therefore indicative of the state of the pipeline modules. This state information can be analyzed to determine whether an instruction is being executed by instruction pipeline 110 in an expected fashion.

The trace monitoring module 112 is configured to monitor state information at the instruction pipeline 110 and, in response to one or more designated events, generates a trace message. Each trace message includes state information indicative of the state of a portion of the instruction pipeline 110. For example, a trace message can indicate what instruction, or portion of decoded instruction, is being executed at a particular module of the instruction pipeline 110, the information stored in one or more state registers of the pipeline, a program counter value, and the like.

The trace monitoring module 112 includes a timestamp counter 113 configured to store a timestamp value indicative of the amount of time elapsed since the counter was reset. When the trace monitoring module 112 generates a trace message, it can determine whether one or more designated conditions are satisfied, as described further below. If the one or more conditions are satisfied, the trace monitoring module 112 can access the timestamp value stored at the timestamp counter 113 and include the timestamp value in the generated trace message. For purposes of discussion, a trace message that includes a timestamped is referred to herein as a "timestamped trace message." Timestamped trace messages provide an indication of when the message was generated, and thus indicate when the instruction pipeline 110 was in the state indicated by the message's state information. Such information can be useful in debugging a set of instructions executing at the instruction pipeline 110.

In addition, the trace monitoring module 112 can monitor different portions of the instruction pipeline 110, and generate different trace messages for each monitored portion. The set of generated trace messages associated with a monitored portion of the instruction pipeline 110 is referred to herein as a trace message stream. Generation of separate trace message streams for different portions of the instruction pipeline 110 allows the different pipeline portions to be monitored and debugged independently.

The trace buffer 114 is configured to receive and store trace messages generated by the trace monitoring module 112. For example, in the illustrated embodiment, trace buffer 114 stores trace messages 117 and 118. In addition, trace buffer 114 is configured to provide stored trace messages to the debug interface 103 in response to a request from the external debugger. In an embodiment, the trace buffer 114 is a circular buffer that is configured to overwrite stored trace messages with new trace messages that are received when the buffer is full.

The trace control module 116 is configured to receive control information from the external debugger via the debug interface 103. Based on the received control information, the trace control module 116 can store one or more trace control settings. The trace monitoring module 112 can access the trace control settings in order to determine the events at the instruction pipeline 110 that will trigger generation of trace messages and in order to determine the conditions that will result in timestamps being included with a generated trace message.

In operation, the external debugger provides control information indicative of the events designated to cause generation of a trace message. The external debugger also provides control information indicative of the conditions that will result in timestamps being included with a generated trace message. The debug interface 103 communicates the control information to the trace control module 116, which configures the trace control settings based on the control information.

The trace monitoring module 112 accesses the trace control settings to determine the events that will trigger generation of a trace message. For purposes of discussion, this event is referred to as a "trace message event." The trace monitoring module also monitors the conditions that will cause a timestamp to be included in the message. For purposes of discussion, these conditions are referred to as the "timestamp conditions." The trace monitoring module 112 monitors the instruction pipeline 110 for the trace message event. In response to detecting the trace monitoring event, the trace monitoring module 112 determines whether the timestamp conditions are satisfied. If not, the trace monitoring module 112 generates a trace message without a timestamp included in the message. If the timestamp conditions are satisfied, the trace monitoring module 112 retrieves a timestamp from timestamp counter 113 and generates a trace message including the retrieved timestamp. The trace monitoring module 112 stores the generated trace message at the trace buffer 114, where it can be accessed by the external debugger via the debug interface 103.

The operation of the data processing device 100 can be better understood with reference to an example. In this example, the trace message event is the decoding of a LOAD instruction at the instruction pipeline 110. The timestamp conditions occur when the amount of information stored at the trace buffer 114 exceeds an amount indicated by a watermark value. In operation, the external debugger provides control information indicating the trace message event and the timestamp conditions to the trace control module 116. In response, the trace control module 116 sets the trace control settings so that the trace monitoring module 112 will generate a trace message in response to detecting the decoding of a LOAD instruction, and so that a generated trace message will include a timestamp when the amount of information stored at the trace buffer 114 exceeds the watermark value.

The trace monitoring module 112 monitors the instruction pipeline 110. In response to detecting that a LOAD instruction has been decoded, the trace monitoring module 112 determines that a trace message should be generated. Accordingly, the trace monitoring module 112 determines whether the amount of information stored at the trace buffer 114 exceeds the watermark value. If not, the trace monitoring module 112 generates a trace message without a timestamp and stores the message at trace buffer 114. If the amount of information stored at the trace buffer 114 exceeds the watermark value, the trace monitoring module generates a trace message with a timestamp stores the message at trace buffer 114.

As illustrated by this example, the granularity of generation of timestamped trace messages can be controlled based on one or more conditions at the data processing device 100. Accordingly, timestamps may not be generated for each trace message, allowing trace buffer 114 to store more messages or be a smaller size. Further, the condition under which a timestamped trace message is generated is based on a programmable event. Thus, the generation of a timestamped message can be based on one or more of a number of conditions. In one embodiment, the condition that results in generation of a timestamp is based on a programmable watchpoint, such as an instruction type, access of a memory address or memory address range, determination of a designated data address, execution of a designated thread at the instruction pipeline 110, and the like. The particular watchpoint associated with a timestamp condition can be programmed at the external debugger and provided to the trace control module 116. Other conditions that can be enabled to generate a timestamp with a trace message can be based on the amount of information stored at the trace buffer 114, the occurrence of a designated interrupt, the generation of a designated number of trace messages, a change in frequency of a clock signal associated with the data processing device 100, a change in a power mode of the data processing device 100 (such as a portion of the device being placed in a low-power mode or an active mode), and the like. In addition, the condition that results in generation of a timestamp can be based on a signal or other indication received from the external debugger via the debug interface 103. This allows the external debugger to control when timestamps are generated.

In an embodiment, different timestamp conditions can be enabled for different trace streams. Thus, one trace stream can include timestamps for trace messages generated under designated conditions, while a second trace stream includes timestamps for trace messages generated based on different conditions. For example, one trace stream can include trace messages that include timestamps when a particular interrupt is received, while another trace stream includes trace messages that include timestamps when the number of trace messages at the trace buffer 114 exceeds a watermark.

Figure 2:
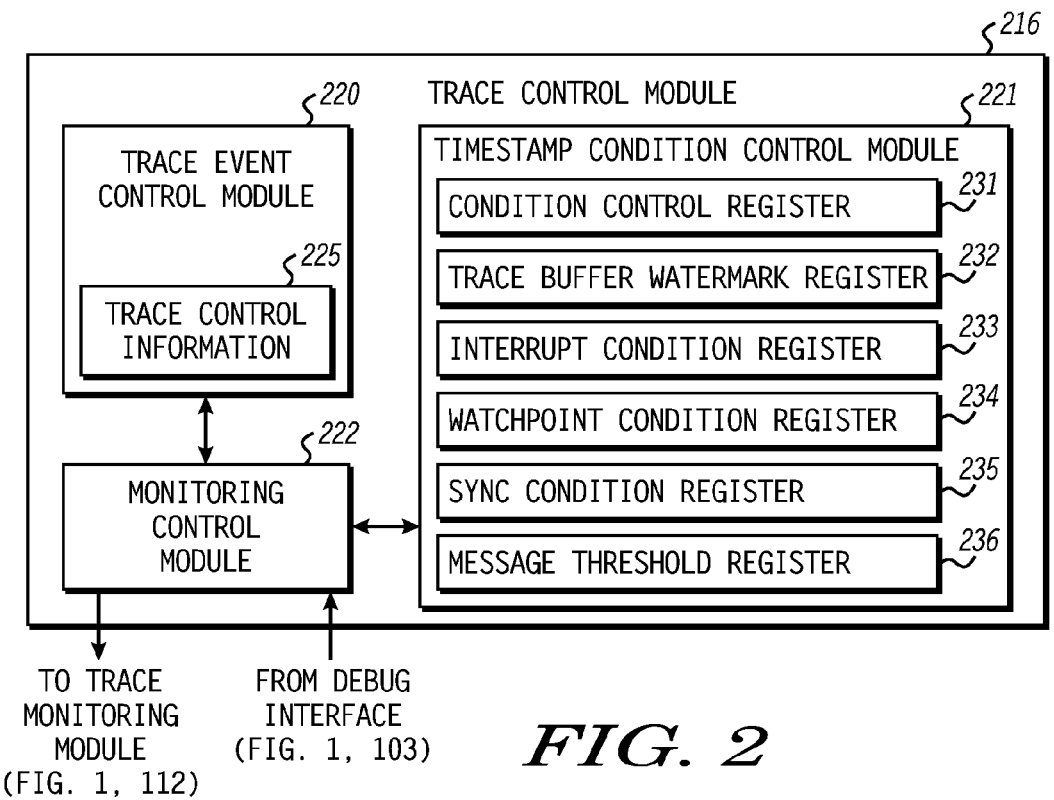
FIG. 2 illustrates a block diagram of a particular embodiment of the trace control module of FIG. 1.

FIG. 2 illustrates a block diagram of a particular embodiment of a trace control module 216, corresponding to the trace control module 116 of FIG. 1. The trace control module 216 includes a trace event control module 220, a timestamp condition control module 221, and a monitoring control module 222. The trace event control module 220 and timestamp condition control module 221 are each connected to the monitoring control module 222. The monitoring control module 222 is also connected to trace monitoring control module 112 (FIG. 1) and debug interface 103 (FIG. 1).

The monitoring control module 222 provides an interface between the trace event control module 220, the timestamp condition control module 221, the trace monitoring module 112, and the debug interface 103. In particular, the monitoring control module 222 is configured to receive control information from the debug interface 103 and, based on the control information, store one or more trace control settings at the trace event control module 220 and the timestamp condition control module 221. In addition, the monitoring control module 222 is configured to communicate the trace control setting to the trace monitoring module 112.

The trace event control module 220 stores trace control information 225. The trace control information 225 indicates the trace message event that will trigger generation of a trace message at the trace monitoring module 112. In an embodiment, the trace control information 225 can indicate multiple trace message events, as well as information to indicate whether all events, a particular combination of events, or a single event must be satisfied to generate a trace message.

The timestamp condition module 221 is configured to store information indicating the timestamp conditions that will cause a generated trace message to include a timestamp. In particular, the timestamp condition module 221 includes a condition control register 231, a trace buffer 232, an interrupt condition register 233, a watchpoint condition register 234, a sync condition register 235, a message counter 236, and a message threshold register 236.

Figure 3:
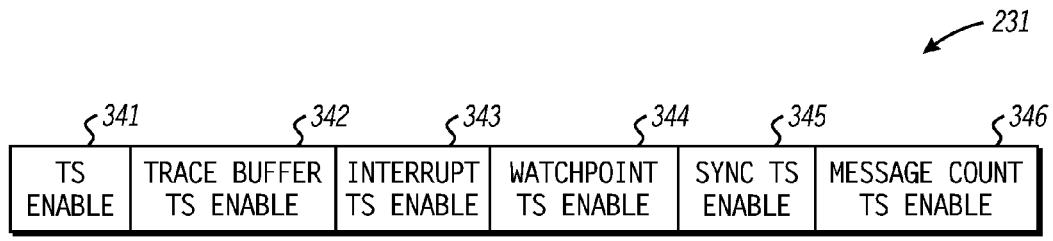
FIG. 3 illustrates a block diagram of a particular embodiment of the condition control register of FIG. 2.

The timestamp condition register 231 stores information indicating which types of conditions will cause a generated trace message to include a timestamp. The timestamp condition register 231 can be better understood with reference to FIG. 3, which illustrates a block diagram of a particular embodiment of the register. In the illustrated embodiment, the timestamp condition register 231 includes a timestamp enable field 341, a trace buffer timestamp enable field 342, an interrupt timestamp enable field 343, a watchpoint timestamp enable field 344, a sync timestamp enable field, and a message count timestamp enable field 346. For purposes of discussion, it is assumed that each field stores information such that it is either in an asserted or a negated state.

With respect to the timestamp enable field 341, when it is in a negated state the trace monitoring module 112 (FIG. 1) is configured such that it does not include timestamps in any generated trace message, regardless of other conditions. When the timestamp enable field 341 is in an asserted state, the trace monitoring module 112 is configured to generate timestamped trace messages based on one or more detected conditions, where the types of detected conditions are indicated by the other fields of the timestamp condition register 231. For purposes of discussion of the other fields, it is assumed that the timestamp enable field 341 is in an asserted state, so that a trace message will include a timestamp if the conditions associated with that field are satisfied.

When trace buffer timestamp enable field 342 is in the asserted state, the trace monitoring module 112 will include a timestamp in a generated trace message if the amount of information stored at trace buffer 114 is in a defined relationship to a watermark value stored at trace buffer watermark register 232 (FIG. 2). In an embodiment, the timestamp can be generated when the amount of information stored at trace buffer 114 exceeds the watermark value, and the watermark value can be set so that a trace message will be generated with a timestamp when it is more likely a trace message stored at the trace buffer 114 is likely to be overwritten. This can improve reliability of the debug process. For example, if trace messages stored at the trace buffer 114 are not overwritten, the external debugger can determine the timing of events, and associated instruction pipeline state, based on the sequence of the trace messages. If a trace message is overwritten by a new trace message, and the trace buffer timestamp enable field 342 is asserted, the new trace message will include a timestamp. This timestamp allows the external debugger to determine when the state indicated by the trace message occurred independent of the place of the message in the stored message sequence In another embodiment, the timestamp can be generated when the amount of information stored at the trace buffer 114 is less than the watermark value. In this embodiment, the watermark value can be set so that trace messages include timestamps when the amount of information stored at the trace buffer 114 is relatively small, so that it is unlikely a buffer overflow will occur. When the watermark value is exceeded, indicating an overflow is more likely, the trace messages are generated without timestamps, reducing the size of each trace message and thereby reducing the likelihood of an overflow at the trace buffer 114. In still another embodiment, separate buffer timestamp enable fields can be used to indicate the relationship that will result in timestamps being generated. For example, setting of a first timestamp enable field can indicate that timestamps will be generated when the amount of information at the trace buffer 114 exceeds a particular watermark value, while setting a second, different timestamp enable field can indicate that timestamps will be generated when the amount of information at the trace buffer 114 is less than a particular watermark value. Moreover, the watermark value associated with each timestamp enable field can be different.

When interrupt timestamp enable field 343 is asserted, the trace monitoring module 112 will include a timestamp in a generated trace message if a designated interrupt has occurred. The type of interrupt that will result in the timestamp being included can be based on control information stored at interrupt condition register 233 (FIG. 2). If interrupt timestamp enable field 343 is negated, inclusion of timestamps in a trace message will be independent of whether an interrupt has occurred.

When watchpoint timestamp enable field 344 is asserted, the trace monitoring module 112 will include a timestamp in a generated trace message if a designated watchpoint has been encountered at instruction pipeline 110. The watchpoints that will result in the timestamp being included can be based on control information stored at watchpoint condition register 234 (FIG. 2). Examples of watchpoints can include instruction types, instruction addresses, data addresses, and the like. If watchpoint timestamp enable field 344 is negated, inclusion of timestamps in a trace message will be independent of whether a particular watchpoint has been encountered.

When sync timestamp enable field 345 is asserted, the trace monitoring module 112 will include a timestamp in a generated trace message if a designated sync condition has been encountered at instruction pipeline 110. The sync conditions that will result in the timestamp being included can be based on control information stored at sync condition register 235 (FIG. 2). Examples of sync conditions can include requests from an external debug device to generate a timestamp. If sync timestamp enable field 345 is negated, inclusion of timestamps in a trace message will be independent of whether a particular sync condition has been encountered.

When message count timestamp enable field 346 is asserted, the trace monitoring module 112 will include a timestamp in a generated trace message if a designated number of trace messages have been generated by the trace monitoring module 112. The number of trace messages that will result in the timestamp being included can be based on a threshold value stored at message threshold register 236 (FIG. 2). In an embodiment, the trace monitoring module 112 can include a counter (not shown) to maintain a count of the number of trace messages generated. When that number reaches the threshold indicated by the message threshold register 236, the trace monitoring module 112 can ensure that the next trace message is generated such that it includes a timestamp. In a particular embodiment, the trace monitoring module 112 can reset the counter each time it generates a timestamped trace message, so that timestamps are included in trace messages at regular intervals as indicated by the threshold stored at the message threshold register 236. For example, the threshold can be set so that timestamps are included with every tenth generated trace message. If message count timestamp enable field 346 is negated, inclusion of timestamps in a trace message will be independent of the number of generated trace messages.

In an embodiment, the trace control module 216 can be configured so that detection of one condition at the instruction pipeline 110 can result in adjustment of a second condition. For example, in response to determining the amount of information stored at the trace buffer 114 exceeds the watermark value at register 232, the trace control module 216 can adjust the information stored at the message threshold register 236. This will effectively change the rate at which timestamps are included in trace messages, depending on whether the watermark value has been exceeded. For example, the value stored at the message threshold register 236 can be set so that timestamps are included in every fourth generated trace message. In response to determining the amount of information stored at the trace buffer 114 exceeds the watermark value stored at register 232, the trace control module 216 can adjust the value stored at the message threshold register 236 so that timestamps are included in every eighth trace message.

Figure 4:
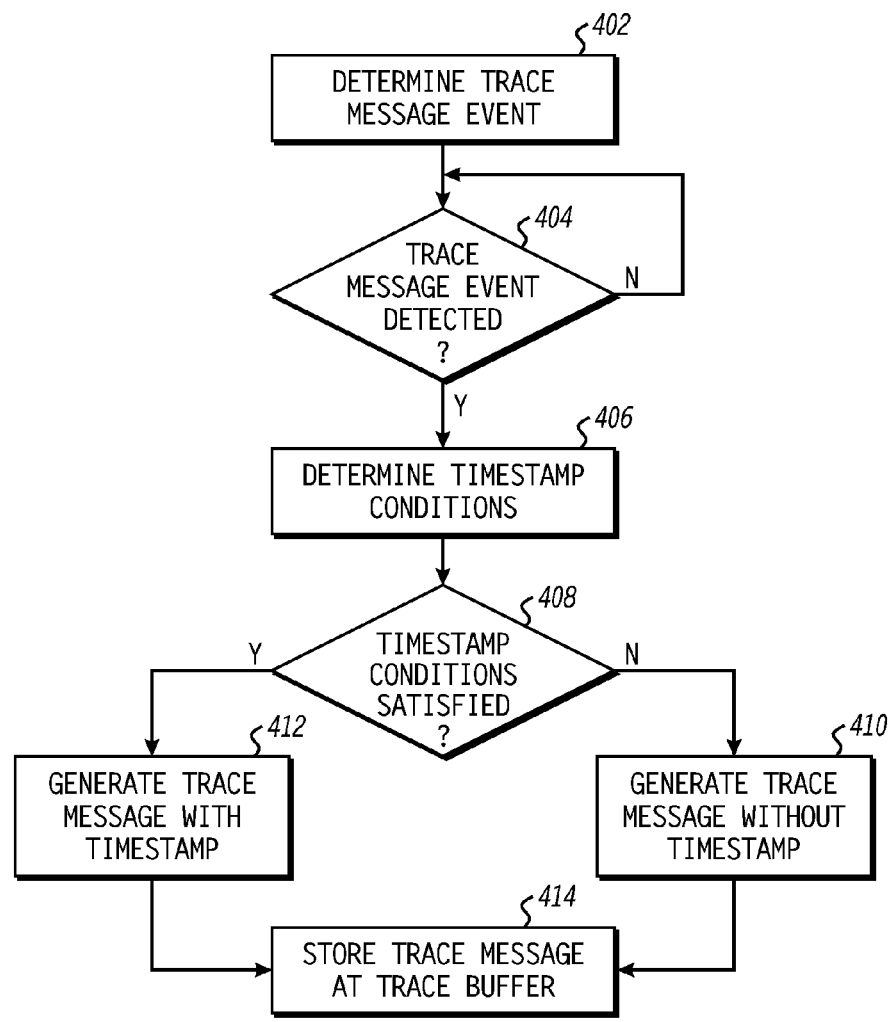
FIG. 4 illustrates a flow diagram of a method of generating trace messages in accordance with one embodiment of the present disclosure.

Referring to FIG. 4, a flow diagram of a particular embodiment of a method of generating a trace message is illustrated. At block 402, the trace monitoring module 112 determines, based on the trace control settings stored at the trace control module 116, the trace message event that will result in generation of a trace message. At block 404, the trace monitoring module 112 monitors the instruction pipeline for the trace message event. In response to detecting the trace message event, the method flow moves to block 406 and the trace monitoring module 112 determines the timestamp conditions based on the trace control settings stored at the trace control module 116. At block 408, the trace monitoring module determines if the timestamp conditions are satisfied. If not, the method flow moves to block 410 and the trace monitoring module 112 generates a trace message without a timestamp. If the timestamp conditions are not satisfied, the method flow moves to block 412 and the trace monitoring module 112 generates a trace message with a timestamp. The method flow proceeds to block 414 and the generated trace message is stored at the trace buffer 114. The stored trace message can be accessed by the external debugger for analysis of instructions executing at the instruction pipeline 110.

Figure 5:
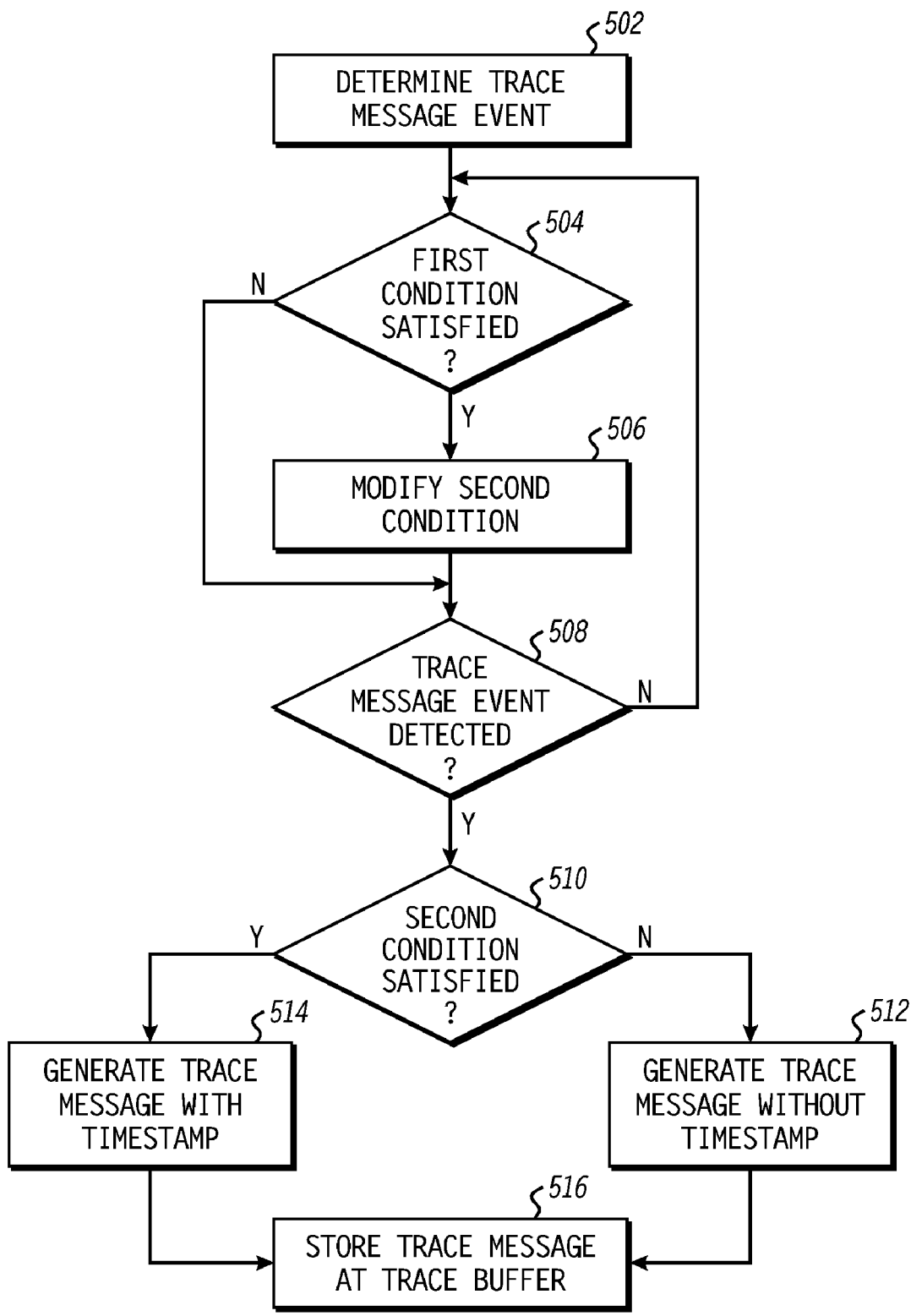
FIG. 5 illustrates a flow diagram of a method of generating trace messages in accordance with another embodiment of the present disclosure.

Referring to FIG. 5, a flow diagram of a particular embodiment of a method of generating a trace message is illustrated. At block 502, the trace monitoring module 112 determines, based on the trace control settings stored at the trace control module 116, the trace message event that will result in generation of a trace message. At block 504, while the instruction pipeline 110 executes instructions, the trace control module 116 determines if a first condition is satisfied. For example, the trace control module 116 can determine if a defined or programmable number of trace messages have been generated. If the first condition is satisfied, the method flow moves to block 506 and the trace control module 116 modifies a second condition. For example, the trace control module 116 can modify the watermark value associated with the trace buffer 114. The second condition is assumed to be the timestamp condition that will result in a timestamp being included with the trace message. Thus, in response to a first condition being satisfied, the trace control module 116 can modify a second condition that causes timestamps to be included with trace messages. This provides a higher level of granularity control for generation of timestamps.

At block 508, the trace monitoring module 112 monitors the instruction pipeline for the trace message event. In response to detecting the trace message event, the method flow moves to block 510 and the trace monitoring module 112 determines, based on the trace control settings stored at the trace control module 116, if the timestamp conditions are satisfied. If not, the method flow moves to block 514 and the trace monitoring module 112 generates a trace message without a timestamp. If the timestamp conditions are not satisfied, the method flow moves to block 512 and the trace monitoring module 112 generates a trace message with a timestamp. The method flow proceeds to block 516 and the generated trace message is stored at the trace buffer 114. The stored trace message can be accessed by the external debugger for analysis of instructions executing at the instruction pipeline 110.

Figure 6:
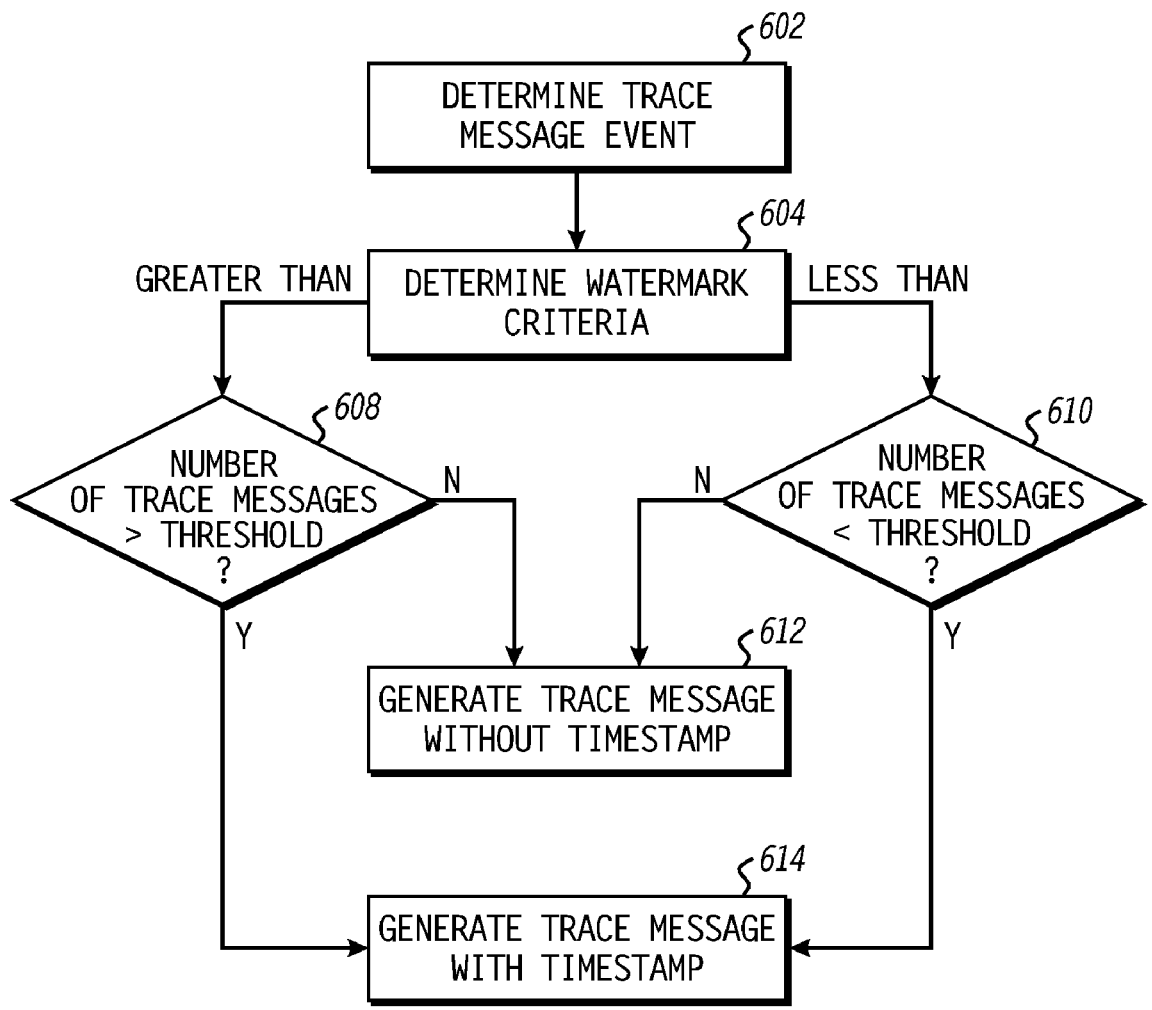
FIG. 6 illustrates a flow diagram of a method of generating trace messages in accordance with another embodiment of the present disclosure.

Referring to FIG. 6, a flow diagram of a particular embodiment of a method of generating a trace message is illustrated. At block 602, the trace monitoring module 112 detects, based on the trace control settings stored at the trace control module 116, that a trace message event has occurred. At block 604, the trace monitoring module 112 determines the watermark criteria to determine if a timestamp should be included with the generated trace message. In particular, the trace monitoring module 112 determines if a timestamp is to be generated when the number of trace messages stored at the trace buffer 114 is greater than the watermark value stored at the trace control module 116, or is to be generated when the number of trace messages is less than the watermark value.

If the watermark criteria indicate the timestamps are to be included with the trace message when the number of trace messages is greater than the watermark value, the method flow moves to block 608. At block 608, the trace monitoring module 112 determines if the number of trace messages is greater than the watermark value. If not, the method flow moves to block 612 and the trace monitoring module 112 generates a trace message without a timestamp. If the number of trace messages is greater than the watermark value, the method flow moves to block 614 and the trace monitoring module 112 generates a trace message with a timestamp.

If, at block 604, the watermark criteria indicate the timestamps are to be included with the trace message when the number of trace messages is less than the watermark value, the method flow moves to block 610. At block 610, the trace monitoring module 112 determines if the number of trace messages is less than the watermark value. If not, the method flow moves to block 612 and the trace monitoring module 112 generates a trace message without a timestamp. If the number of trace messages is less than the watermark value, the method flow moves to block 614 and the trace monitoring module 112 generates a trace message with a timestamp.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method, comprising:
    generating a first trace message at a data processing device in response to a first trace event, comprising:
        in response to determining timestamping for a first condition is enabled, generating the first trace message including a first timestamp based on detecting the first condition; and
        in response to determining timestamping for a second condition is enabled, generating the first trace message including a second timestamp based on detecting the second condition.

2. The method of claim 1, wherein the first condition is based on an amount of buffer space used to store trace messages exceeding a threshold.

3. The method of claim 2, wherein the threshold is a programmable value.

4. The method of claim 1, wherein the first condition is based on a number of trace messages generated at the data processing device.

5. The method of claim 1, wherein the first condition is based on occurrence of a first interrupt.

6. The method of claim 1, wherein the first condition is based on occurrence of a first programmable watchpoint and the second condition is based on occurrence of a second programmable watchpoint different than the first.

7. The method of claim 1, wherein the first condition is based on determination of a first instruction type at an instruction pipeline of the data processing device.

8. The method of claim 1, wherein the first condition is based on determination of a first data address at an instruction pipeline of the data processing device.

9. The method of claim 1, wherein the first condition is based on a change in frequency of a clock signal associated with the data processing device.

10. The method of claim 1, wherein the first condition is based on a change in a power mode associated with the data processing device.

11. The method of claim 1, wherein the first condition is based on a condition associated with a first thread executing at the data processing device and the second condition is based on a condition associated with a second thread executing at the data processing device.

12. The method of claim 1, wherein the first condition comprises a request received at the data processing device from a second device.

13. The method of claim 1, wherein the first condition is associated with a first transport message stream, and the second condition is associated with a second transport message stream.

14. The method of claim 1, further comprising:
    adjusting the second condition based detecting the first condition.

15. A device, comprising:
    an instruction pipeline;
    a trace monitoring module connected to the instruction pipeline, the trace monitoring module configured to:
        generate a first trace message at a data processing device in response to a first trace event;
        in response to determining timestamping for a first condition is enabled, include a first timestamp in the first trace message based on detecting the first condition; and
        in response to determining timestamping for a second condition is enabled, include the first timestamp in the first trace message based on detecting the second condition.

16. The device of claim 15, wherein the trace monitoring module is further configured to:
    in response to determining timestamping for the first condition is enabled, not include the first timestamp in the first trace message based on not detecting the first condition.

17. The method of claim 15, wherein the device further comprises a buffer, and wherein first condition is based on an amount of space available at the buffer to store trace messages exceeding a threshold.

* * * * *